N. J. WHITAKER.
WHEEL SHOE.
APPLICATION FILED DEC. 19, 1917. RENEWED FEB. 12, 1919.
1,318,635.
Patented Oct. 14, 1919.
2 SHEETS—SHEET 1.
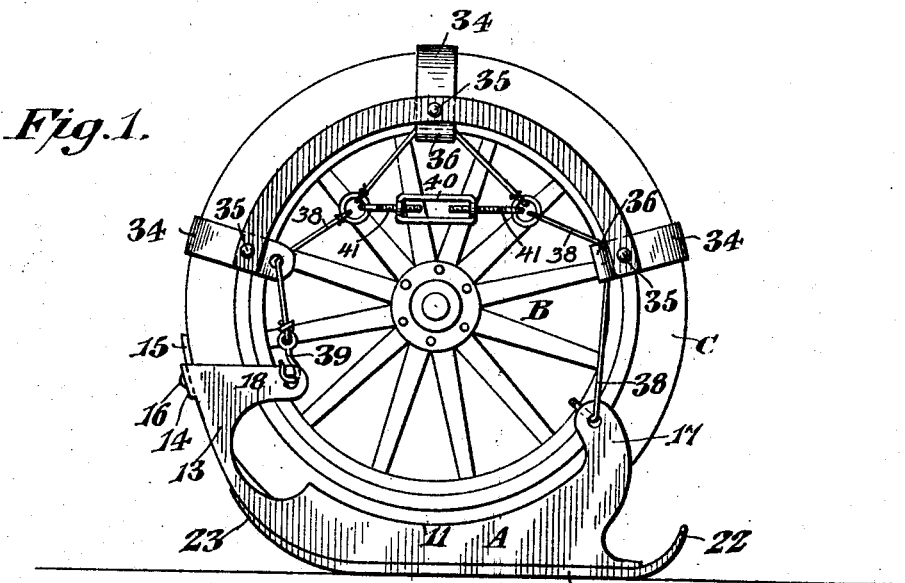
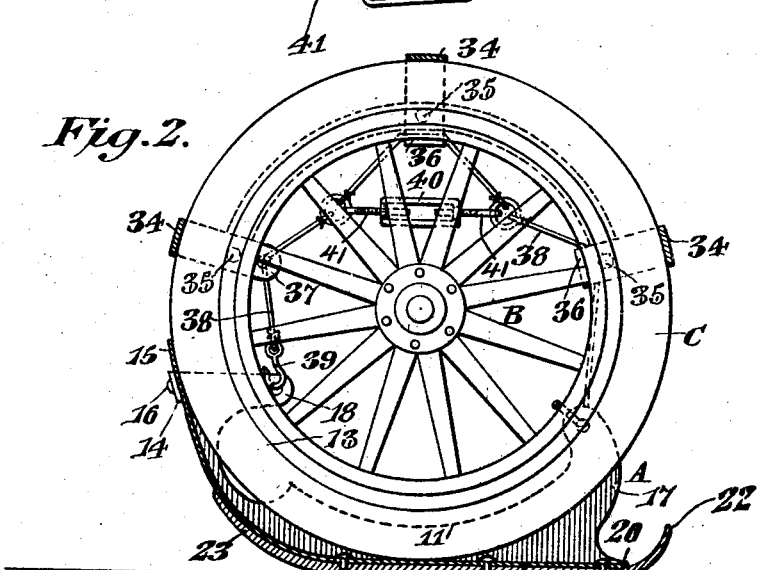
WITNESSES
INVENTOR
Nathan J. Whitaker,
BY
ATTORNEY N. J. WHITAKER.
WHEEL SHOE.
APPLICATION FILED DEC. 19, 1917. RENEWED FEB. 12, 1919.
1,318,635.  Patented Oct. 14, 1919.
2 SHEETS—SHEET 2.
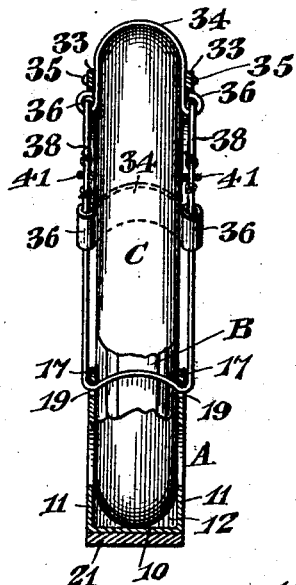
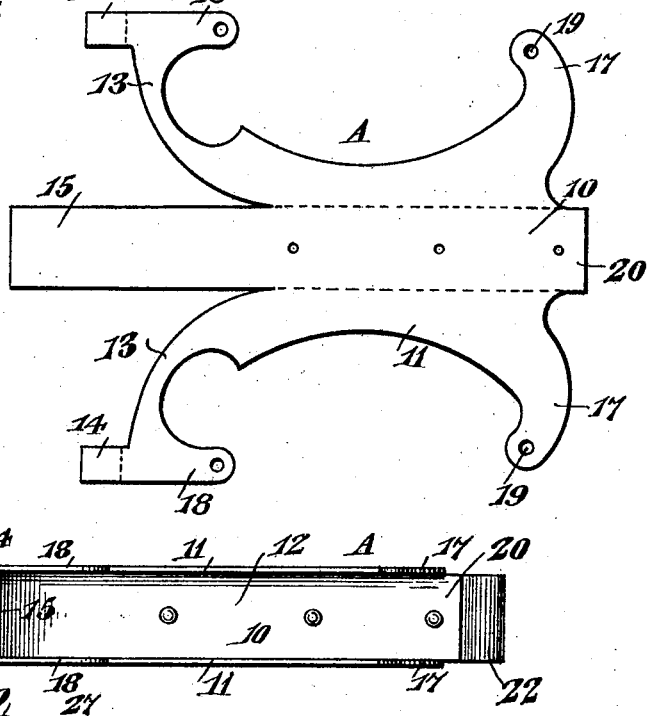
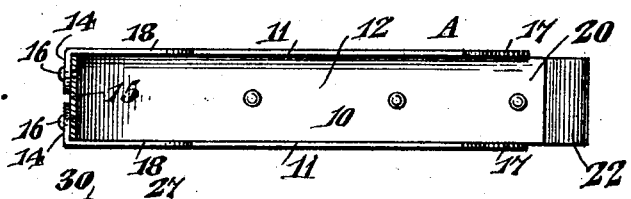
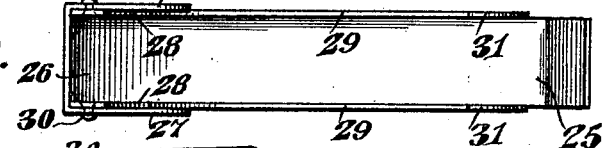
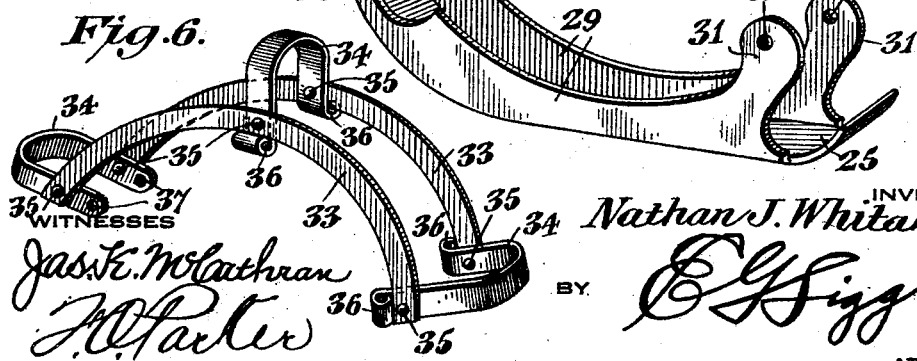
INVENTOR
Nathan J. Whitaker,
BY
ATTORNEY

UNITED STATES PATENT OFFICE.

NATHAN J. WHITAKER, OF GLOVERSVILLE, NEW YORK.

WHEEL-SHOE.

1,318,635.     Specification of Letters Patent.     Patented Oct. 14, 1919.

Application filed December 19, 1917, Serial No. 207,920. Renewed February 12, 1919. Serial No. 276,601.

*To all whom it may concern:*

Be it known that I, NATHAN J. WHITAKER, a citizen of the United States, residing at Gloversville, in the county of Fulton and State of New York, have invented a new and useful Wheel-Shoe, of which the following is a specification.

The invention relates to a wheel shoe, and more particularly to the class of snow shoes in the form of runners for use on vehicle wheels such as carriages, wagons, automobiles and the like.

The primary object of the invention is the provision of a shoe of this character, wherein the wheel of the vehicle is readily mounted therein and snugly fastened to be rigidly held without damage thereto, so that the vehicle will be converted for use as a sleigh.

Another object of the invention is the provision of a shoe of this character, wherein the necessity of the removal of the wheel of the vehicle from its axle is entirely eliminated, and the shoe can be readily applied to or removed from the wheel with despatch, to be used as a runner therefor over ice or snow surfaces, so that the vehicle is adaptable for twin purposes, namely, for use in the ordinary manner, or as a sleigh, the adaptability of the shoe to the wheel avoiding the necessity of the application of a runner to the axle as is usual when it is desired to convert the vehicle into a sleigh.

A further object of the invention is the provision of a shoe of this character which is comparatively light in weight, yet possesses the requisite rigidity and strength, and does not require the removal of the wheel from its axle when applying or removing said shoe, and the application and removal can be executed with dispatch.

A still further object of the invention is the provision of a shoe of this character which is adaptable for use to convert the vehicle into a sleigh, and when applied will protect the tires of the wheels from wear and tear, as would be the result when traveling over snow or ice surfaces.

A still further object of the invention is the provision of a shoe of this character which is extremely simple in construction, possesses few parts, and is inexpensive to manufacture and install.

With these and other objects in view, the invention consists in the features of construction, combination and arrangement of parts as will be hereinafter fully described, illustrated in the accompanying drawings, and pointed out in the claims hereunto appended.

In the accompanying drawings—

Figure 1 is a side elevation of a wheel showing the shoe constructed in accordance with the invention applied and fastened to the wheel;

Fig. 2 is a vertical longitudinal sectional view through the shoe and fastening device;

Fig. 3 is a vertical transverse sectional view thereof;

Fig. 4 is a top plan view of the shoe;

Fig. 5 is a plan view showing the blank from which the shoe is made;

Fig. 6 is a perspective view of the saddle frame of the fastening device for the shoe;

Fig. 7 is a perspective view of a modified form of shoe;

Fig. 8 is a top plan view thereof;

Fig. 9 is a detail perspective view of the tightening device.

Similar reference characters indicate corresponding parts throughout the several views in the drawings.

Referring to the drawings, particularly Figs. 1 to 6 inclusive, the shoe comprises a body A preferably formed from a blank (see Fig. 5) cut to provide an intermediate runner section 10 and outer side flanges 11 which are bent upwardly and inwardly in parallel relation to each other at opposite side edges of the runner section 10 to provide a channel 12 therebetween for accommodating the wheel B which, in this instance, is fitted with the usual pneumatic tire C in the ordinary well known manner. The side flanges 11 are formed with upwardly curved forward end portions 13 having at their extremities inturned ears 14 at right angles thereto.

The forward end portion 15 of the runner section 10 is upwardly bent correspondingly to the curvature of the end portions 13, and extends a slight distance beyond the ears 14 on the extremities of the end portions 13, the ears 14 being riveted or otherwise secured at 16 to the forward end portion 15 of the runner section at the outer face thereof. The side flanges 11 at their rear ends are formed with rearwardly and upwardly curved arms 17, while the extremities of the forward end portions 13 are formed with horizontally disposed rearwardly extending arms 18, the arms 17 and 18 being provided with holes 19 for the engagement of a fastening device with the shoe as will be hereinafter fully described.

The runner section 10 has its rear end portion 20 extended beyond the flanges 11, and on the under face of this section 10 is riveted or otherwise secured a tread piece or strip 21 which extends beyond the rear end 20 of said section and is formed wth an upwardly curved rear end 22, while the forward end 23 extends upwardly, and over the outer face of the forward end portion 15 of the section, thereby strengthening said section and preventing wear thereon when the shoe serves as the sleigh runner.

In Figs. 7 and 8, there is shown a slight modification of the shoe, wherein the runner section 25 thereof at the extremity of its upwardly curved forward end 26 is formed with the rearwardly extending horizontal arms 27 which overlap the extremities of the forward ends 28 which are correspondingly curved to the end 26, of the side flanges 29, the arms 27 being riveted or otherwise secured at 30 to said ends 28, while at the rear ends of the flanges 29 are the upstanding arms 31 which, together with the arms 27, are formed with holes 32 for the mounting of the shoe upon the wheel B by the fastening device hereinafter fully described.

The runner section 25 is devoid of the tread piece 21, so that the bottom of said runner section constitutes the tread for the shoe.

The fastening device comprises a saddle frame including spaced upwardly arched side bars 33, the curvature of which corresponds with the curvature of the wheel B at its rim and intermediate and outer upwardly arched or inverted substantially U-shaped cross straps 34 which are riveted or otherwise secured at 35 to the bars 33 at the inner sides thereof, the outer straps 34 being located at the ends of the bars 33, while the intermediate strap is medially thereof. The intermediate strap and the rearmost outer strap is formed with sleevelike eye terminals 36, while the remaining forward outer strap is formed with perforated ear terminals 37 for a purpose presently described.

The saddle frame is positioned upon the wheel B over the tire C at the upper half of said wheel, as shown in Figs. 1, 2 and 3 of the drawings, and loosely passed through the sleeve-like eye terminals 36 and perforated ears 37 is a flexible tie member 38 in the form of a cable or chain, the same being also trained through the holes in the rear arms 17 or 31 of the shoe crosswise of the rim of the wheel B between adjacent spokes thereof so as to extend transversely over the inner face of the rim while the ends of said tie member 38 carry hooks 39 for detachable engagement in the holes in the front arms 18 or 27 of the shoe, so that in this manner the said shoe is fastened upon the wheel B. The tie member 38 is tightened for the secure fastening of the wheel in the shoe through the medium of a tightening device hereinafter described.

The tightening device comprises a turn buckle 40 in opposite ends of which are screwed eye-bolts 41 through the eyes of which are trained opposite stretches of the tie member 38, it being understood, of course, that the tightening devices are located on opposite sides of the wheel, and by manipulating the turn buckles 40 thereof, the tie member can be drawn taut to firmly secure the wheel between the saddle frame and the shoe and fixed within the latter to avoid displacement relative to each other.

On loosening the turn buckles 40, the tie member 38 is slackened, and the hooks 39 on the ends thereof can be readily disengaged from the holes in the front arms of the shoe, so that the saddle frame can be removed from the upper portion of the wheel and the wheel extracted from the shoe for the detachment of the latter from the wheel with despatch. The straps 34 of the saddle frame contact with the tire C on the wheel B at 3 points thereof, and partially surround said tire for the firm clamping of the saddle frame upon the wheel without possibility of the slipping thereof, and at the same time avoiding damage to the tire as the clamping action of the saddle frame is distributed at different points thereof.

When the shoe is applied and fastened in the manner as hereinbefore set forth, the pneumatic tire C which is understood to be inflated, serves as a resilient cushion for the wheel between it and the shoe, thereby relieving shocks and jars incident to the travel of the vehicle. The vehicle is convertible into a sleigh by the use of the shoes for travel over snow or ice surfaces, and on removal of the shoes, the vehicle can be used in the usual manner.

The shoe in its construction, is rendered strong and durable, and is readily applied to and removed from the wheel by the use of the fastening device with despatch, thus the shoe affords a convenient sleigh runner for universal use on vehicles of various types, and thereby permits the converting of the wheeled vehicle into a sleigh.

From the foregoing, it is thought that the construction and manner of use of the shoe will be clearly understood, and therefore a more extended explanation has been omitted.

It is to be understood that changes, variations and modifications may be resorted to in the invention such as come properly within the scope of the appended claims without departing from the spirit of said invention or sacrificing any of its advantages.

What is claimed is:

1. A shoe of the character described, comprising a runner section, side flanges on said runner section, an upwardly curved forward end on the runner section, upwardly extending ends on the flanges correspondingly curved to the forward ends of the runner section, rearwardly extending arms having means securing the forward ends of the section and flanges together, upstanding arms at the rear ends of the flanges, and fastening means for engagement with the vehicle wheel and connected with the arms for securing the shoe upon said wheel.

2. A shoe for a vehicle wheel comprising a blank of material cut to form a runner section, side flanges at opposite edges of the runner section to form a channel therebetween for receiving the wheel, forward upwardly curved end portions on the section and flanges, means for connecting the forward ends of the section and flanges together and constituting arms, arms on the rear ends of the flanges, and means for connection with the arms for fastening the wheel in the channel between said flanges.

3. A shoe for a vehicle wheel comprising a blank of material cut to form a runner section, side flanges at opposite edges of the runner section to form a channel therebetween for receiving the wheel, forward upwardly curved end portions on the section and flanges, means for connecting the forward ends of the section and flanges together and constituting arms, arms on the rear ends of the flanges, means for connection with the arms for fastening the wheel in the channel between said flanges, and a tread piece on the under face of the runner section.

4. A shoe for a vehicle wheel comprising a blank of material cut to form a runner section, side flanges at opposite edges of the runner section to form a channel therebetween for receiving the wheel, forward upwardly curved end portions on the section and flanges, means for connecting the forward ends of the section and flanges together and constituting arms, arms on the rear ends of the flanges, means for connection with the arms for fastening the wheel in the channel between said flanges, a tread piece on the under face of the runner section, and an upwardly curved rear end on the tread piece extended beyond the rear end of the runner section.

5. The combination with a vehicle wheel shoe, of a fastening device comprising a saddle frame having intermediate and outer spaced cross straps for embracing the wheel at different points thereof, a flexible tie member engaged with the cross straps and the shoe, and means for rendering taut the tie member to fasten the vehicle wheel in the shoe and saddle frame.

6. The combination with a vehicle wheel shoe, of a fastening device comprising a saddle frame including upwardly arched side bars, intermediate and outer cross straps secured to the bars and adapted to bridge the wheel at a plurality of points thereof, sleeve-like eye terminals formed on certain of the cross straps, perforated eye terminals formed on the remaining strap, a flexible member engaged with the shoe and trained through the eye terminals of the cross straps, and means for tightening the flexible member when engaged with the eye terminals and shoe for securing the wheel in the saddle frame and the latter.

7. The combination with a vehicle wheel shoe, of a fastening device comprising a saddle frame including upwardly arched side bars, intermediate and outer cross straps secured to the bars and adapted to bridge the wheel at a plurality of points thereof, sleeve-like eye terminals formed on certain of the cross straps, perforated eye terminals formed on the remaining strap, a flexible member engaged with the shoe and trained through the eye terminals of the cross straps, means for tightening the flexible member when engaged with the eye terminals and shoe for securing the wheel in the saddle frame and the latter, and means for detachably connecting the ends of the flexible member to the shoe.

8. The combination with a vehicle wheel shoe having upwardly extending arms provided with openings, a saddle frame having spaced cross straps for embracing the wheel at different points thereon and also provided with openings, and a flexible tie member passed through the openings of the saddle frame and wheel shoe for connecting said parts together.

9. The combination with a vehicle wheel shoe having upwardly extending arms at opposite ends provided with openings, said arms fitting on each side of a vehicle wheel, a saddle frame arranged on top of the wheel and having spaced cross straps for embracing the wheel at different points thereof, said saddle frame being also provided with openings, a flexible tie member passed through the openings of the wheel shoe and saddle frame, and a tightening device for drawing together the tie member for the purpose of securely holding the wheel shoe and the saddle frame upon the wheel of a vehicle.

10. The combination with a vehicle wheel shoe having side flanges to embrace the lower portion of a wheel, said flanges having upwardly extending arms, a saddle frame embracing the upper portion of the wheel and provided with spaced cross straps at different points thereon, and a flexible tie member connected with the several cross straps and with the arms of the wheel shoe for holding the two parts about the wheel of a vehicle, and means for tightening said tie member.

In testimony that I claim the foregoing as my own I have hereto affixed my signature in the presence of two witnesses.

NATHAN J. WHITAKER.

Witnesses:
 WILLIAM B. BAKER,
 FLORENCE HOLLETT.

Copies of this patent may be obtained for five cents each, by addressing the "Commissioner of Patents, Washington, D. C."